(12) United States Patent
Pieper et al.

(10) Patent No.: US 8,621,866 B2
(45) Date of Patent: Jan. 7, 2014

(54) STEAM POWER UNIT

(75) Inventors: Norbert Pieper, Duisburg (DE); Rudolf Pötter, Essen (DE)

(73) Assignee: Siemens Aktiengesellschaft, München (DE)

( * ) Notice: Subject to any disclaimer, the term of this patent is extended or adjusted under 35 U.S.C. 154(b) by 336 days.

(21) Appl. No.: 13/000,660

(22) PCT Filed: Jun. 9, 2009

(86) PCT No.: PCT/EP2009/057096
§ 371 (c)(1),
(2), (4) Date: Mar. 25, 2011

(87) PCT Pub. No.: WO2009/156270
PCT Pub. Date: Dec. 30, 2009

(65) Prior Publication Data
US 2011/0179792 A1    Jul. 28, 2011

(30) Foreign Application Priority Data
Jun. 23, 2008 (EP) .................................. 08011332

(51) Int. Cl.
*F01K 23/10* (2006.01)
*F01K 17/00* (2006.01)
*F01K 13/00* (2006.01)

(52) U.S. Cl.
USPC .................................. 60/618; 60/677; 60/648

(58) Field of Classification Search
USPC .......................................... 60/618, 677, 648
See application file for complete search history.

(56) References Cited

U.S. PATENT DOCUMENTS

| | | | | |
|---|---|---|---|---|
| 3,255,586 A | * | 6/1966 | Hennig et al. | .................. 60/773 |
| 4,628,693 A | * | 12/1986 | Riollet | ............................ 60/648 |
| 5,727,377 A | | 3/1998 | Fetescu | |
| 6,134,891 A | * | 10/2000 | Zaviska et al. | .................. 60/648 |
| 7,017,357 B2 | * | 3/2006 | Brasz | ............................ 62/115 |
| 2008/0010968 A1 | * | 1/2008 | Hartmann et al. | ......... 60/39.182 |
| 2011/0247333 A1 | * | 10/2011 | Srinivasan et al. | ............. 60/663 |

FOREIGN PATENT DOCUMENTS

| | | |
|---|---|---|
| CN | 1165909 A | 11/1997 |
| CN | 101027468 A | 8/2007 |
| CN | 101072935 A | 11/2007 |
| DE | 10 49 875 B | 2/1959 |
| DE | 1049875 B | 2/1959 |
| EP | 2138677 A1 | 12/2009 |
| FR | 2560636 A1 | 9/1985 |
| JP | 2007192152 A | 8/2007 |

OTHER PUBLICATIONS

Minychthaler et al., "Der Betrieb der Kraft-Wärme-Kopplung in den Kraftwerken von Wienstrom"; VGB Kraftwerkstechnik, Essen, Germany, 1998, pp. 102-106; vol. 78, No. 5, XP000742274; ISSN: 0372-5715.

* cited by examiner

*Primary Examiner* — Thomas Denion
*Assistant Examiner* — Jessica Kebea

(57) ABSTRACT

A steam power unit including a double-flow medium pressure turbine section that is fluidically connected to a low pressure turbine section is provided. A flow section of the medium pressure turbine section is configured to supply an external steam consumer. A throttle valve for adjusting the pressure in the steam extraction line is arranged only in a turbine discharge line.

8 Claims, 1 Drawing Sheet

STEAM POWER UNIT

CROSS REFERENCE TO RELATED APPLICATIONS

This application is the US National Stage of International Application No. PCT/EP2009/057096, filed Jun. 9, 2009 and claims the benefit thereof. The International Application claims the benefits of European Patent Office application No. 08011332.7 EP filed Jun. 23, 2008. All of the applications are incorporated by reference herein in their entirety.

FIELD OF INVENTION

The invention refers to a steam power plant, comprising an intermediate-pressure turbine section with a plurality of stages comprising a first flow, and a plurality of stages comprising a second flow, and also with a steam-extraction line in the second flow for extracting steam for an external consumer, wherein the first flow has a first turbine discharge line and the second flow has a second turbine discharge line, a crossover line, a throttle valve and a low-pressure turbine section, wherein the crossover line is fluidically connected to the first turbine discharge line, to the second turbine discharge line, and to the low-pressure turbine section.

Furthermore, the invention refers to a method for supplying an external steam consumer with steam, wherein an intermediate-pressure turbine section is provided with a first flow and a second flow and the steam consumer is supplied with steam by means of the second flow via a steam-extraction line, wherein expanded steam from the first flow, via a first turbine discharge line, and expanded steam from the second flow, via a second turbine discharge line, enters a crossover line into a low-pressure turbine section.

BACKGROUND OF INVENTION

A steam turbine is also referred to as a turbomachine. As a rule, inter alia steam and gas turbines, water turbines and also centrifugal compressors are understood by the term turbomachine. These machines predominantly serve the purpose of extracting energy from a flow medium in order to drive another machine therewith, such as a generator.

Steam turbines as a rule are split into high-pressure, intermediate-pressure and low-pressure turbine sections. A turbine section, which on the inlet side is exposed to admission of superheated steam which may have temperatures of up to 620° C. and a pressure of up to 300 bar, is understood by a high-pressure turbine section in this application. The aforesaid temperature and pressure specifications are only indicative values. Turbine sections which are designed for higher temperatures and for higher pressures can also be referred to as high-pressure turbine sections. An intermediate-pressure turbine section is customarily exposed to admission of superheated steam which has a temperature of approximately 620° C. and a pressure of approximately 40 to 70 bar. A low-pressure turbine section is customarily exposed to admission of steam which issues from the intermediate-pressure turbine section. This steam which issues from the low-pressure turbine section is finally collected in a condenser and reconverted into water.

As a rule, the steam which issues from the high-pressure turbine section is heated in a reheater and flows into the intermediate-pressure turbine section.

The division into high-pressure, intermediate-pressure and low-pressure turbine sections is not consistently applied among experts. Thus, the steam parameters such as temperature and pressure cannot be applied as single differentiating criteria between a high-pressure, intermediate-pressure and low-pressure turbine section. An essential feature for identifying an intermediate-pressure turbine section is that this is exposed to admission of steam which comes from the high-pressure turbine section and is heated in a reheater to a higher temperature.

In a steam power plant, the thermal energy of the steam is predominantly converted into mechanical energy in order to drive a turbogenerator, for example. However, it is also known that steam turbines do not deliver only mechanical energy but also provide steam for specific purposes. For example, steam can be extracted from the steam turbine in order to provide process steam for a chemical process or to provide heating steam for district heating.

Such steam as a rule must be provided at a defined pressure. It is known to design a steam turbine in a steam plant in such a way that downstream of a specific stage a certain portion of steam is extracted at an extraction point which is provided for other purposes. The remaining steam is furthermore used for converting thermal energy into mechanical energy. However, it can happen that during operation of the steam turbine at partial load or with increased steam extraction, the pressure of the steam at the extraction point drops. Additional measures would then have to be adopted in order to achieve the required steam pressure.

The extraction of steam from the steam turbine for downstream processes may gain in importance within the scope of a subsequent $CO_2$ separation. For this, a steam requirement which lies between 40% and 60% of the steam mass flow at the outlet of the intermediate-pressure turbine section at a pressure within the range of between 3.5 and 5.5 bar is expected.

Steam power plants with double-flow, intermediate-pressure turbine sections (see FIG. 1) are known, wherein the intermediate-pressure turbine section has a first flow and a second flow and the first and second flows in each case have a steam-extraction line which are formed in such a way that an external steam consumer is supplied with steam. The steam which flows from the first flow and from the second flow flows into the space between inner and outer casings which is connected to the crossover line and to the extraction connection, as a result of which a symmetrical construction of the steam turbine with regard to the waste steam system is realized. Furthermore, the first flow has a first turbine discharge line and the second flow has a second turbine discharge line. The first turbine discharge line and the second turbine discharge line lead into a crossover line which fluidically connects the intermediate-pressure turbine section to the low-pressure turbine section. A throttle valve, which sets the pressure in the crossover line and therefore also sets the pressure in the steam-extraction line, is arranged in this crossover line. The steam-extraction line frequently reaches between 2 and 6 bar after the last stage in the second flow. Since the extraction volume which is required for extracting the $CO_2$ from the solvent is almost proportional to the power output of the power plant, the throttle valve in the second turbine discharge line is almost completely closed within a wide power output range. The steam mass flow which is throttled via this throttle valve and the fluidic losses are therefore significantly reduced. The advantage is that such plants can be built without $CO_2$ separation. As a result of a subsequent extension with $CO_2$ separation, additional losses as a result of throttling barely arise.

It is disadvantageous in this case, however, that during extraction the total steam which flows into the low-pressure turbine section is throttled. On account of these throttling losses, the mechanical power output of the steam turbine is significantly reduced.

It would be desirable to provide suitable steam without greater pressure loss which leads to a lower mechanical power output.

SUMMARY OF INVENTION

The invention starts at this point, wherein the object is to provide a steam power plant with improved steam extraction, wherein flow-related losses are reduced.

Furthermore, it is an object of the invention to disclose a method for supplying an external steam consumer, wherein flow-related losses are reduced.

The object which is focused upon the steam power plant is achieved by means of a steam power plant according to the claims.

The object which is focused upon the method is achieved by means of a
  method according to the claims.

The invention deals with the way of designing a double-flow, intermediate-pressure turbine section with a first flow and with a second flow in such a way that the first flow is fluidically connected directly to the low-pressure turbine section via the crossover line. The second flow has a steam-extraction line with which an external steam consumer is supplied with steam. Furthermore, the second flow has a second turbine discharge line via which steam for the low-pressure turbine section flows into the crossover line. The invention is characterized in that a throttle valve is arranged only in the second turbine discharge line. As a result, it is possible to correspondingly set the pressure of the steam which issues from the steam-extraction line. The steam mass flow in the first turbine discharge line is therefore not throttled.

The first flow has a first turbine discharge line and the second flow has a second turbine discharge line. The first turbine discharge line supplies the low-pressure turbine section with steam. The second turbine discharge line supplies the low-pressure turbine section and the steam-extraction line with steam and therefore also the external steam consumer. The pressure of the steam which is required in the steam-extraction line is set via the throttle valve which is arranged in the second turbine discharge line. Therefore, only the steam which flows in the second turbine discharge line is throttled by the throttle valve, as a result of which a thermodynamic loss ensues.

An advantage of the invention is inter alia also that the swallowing capacity in the second flow can be adapted to the external steam consumer. The swallowing capacity can be compared with a mass flow density and as a rule is specified as a quotient which results from the volume (or the mass) of the flowing steam per time unit (or per cross-sectional area). Therefore, the mass flow which flows via the throttle valve and the fluidic losses are minimized.

The steam which flows into the first flow, like the steam which flows into the second flow, produces a resultant force on the rotor of the intermediate-pressure turbine section. The resultant force in the first flow and the resultant force in the second flow point in opposite directions. Therefore, an asymmetrically resultant thrust force is possible which can be compensated by suitable shaft inclinations or by an adapted reaction degree of the blading.

The power output losses as a result of the extraction of steam for the external steam consumer are now considerably less since the steam in the first flow does not experience any intentional throttling. A further advantage is that the throttle valve in the second turbine discharge line can now be produced more cost-effectively than was previously possible according to the prior art. Furthermore, it is possible to reduce the height of the crossover line.

Advantageous further developments are disclosed in the dependent claims.

The steam-extraction line is advantageously arranged downstream of a steam-extraction stage. The first flow and the second flow comprise several stages. The temperature and the pressure of the throughflowing steam alter per stage. For the external consumer, a specific steam at a specific temperature and a specific pressure is required as a rule. Therefore, it is advantageous to select the stage which provides steam at a suitable temperature and a suitable pressure. It has proved to be advantageous if this steam-extraction stage is arranged downstream or upstream of the last stage.

BRIEF DESCRIPTION OF THE DRAWINGS

Exemplary embodiments of the invention are described with reference to the description and the figures. In this case, components provided with the same designations have the same principle of operation.

In the drawing.

DETAILED DESCRIPTION OF INVENTION

Figure 1:
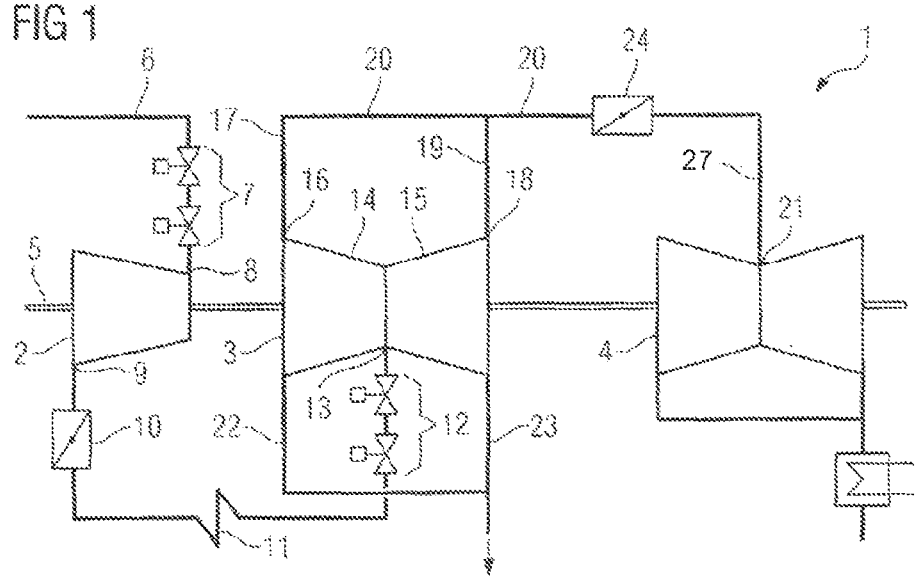
FIG. 1 shows a steam power plant according to the prior art

FIG. 1 shows a steam power plant (1) according to the prior art. The steam power plant (1) comprises a steam turbine comprising a high-pressure turbine section (2), an intermediate-pressure turbine section (3) and a low-pressure turbine section (4) which, via a common shaft train (5), are interconnected with torque-transmitting effect. A generator, which is not shown in more detail, is arranged on the shaft train (5).

Via a live steam line (6), live steam flows via a valve arrangement (7) into a high-pressure steam inlet (8) of the high-pressure turbine section (2). Via stator blades and rotor blades, which are not shown in more detail, the steam is expanded in the high-pressure turbine section (2), the temperature of the steam becoming lower at the same time. The thermal energy of the steam in this case is converted into rotational energy of a rotor, which is not shown in more detail. At a high-pressure steam outlet (9), the steam flows from the high-pressure turbine section (2), via a high-pressure throttle valve (10), to a reheater (11). In the reheater (11), the steam is reheated to a higher temperature. The steam then flows via a second valve arrangement (12) into an intermediate-pressure steam inlet (13) of the intermediate-pressure turbine section (3).

In the intermediate-pressure turbine section (3), the steam is expanded, the temperature of the steam again dropping. The intermediate-pressure turbine section (3) comprises a first flow (14) and a second flow (15). The first flow (14) and the second flow (15) in each case comprise stages, which are not shown in more detail, which are formed by means of stator blades and rotor blades, which are not shown in more detail. The steam which flows into the intermediate-pressure turbine section (3) is split into a first partial flow and into a second partial flow, the first partial flowing through the first flow (14) and the second partial flow flowing into the second flow (15) in the opposite flow direction.

The steam in the first flow (14) flows via a first intermediate-pressure turbine outlet (16) into a first turbine discharge line (17). The steam in the second flow (15) flows via a second intermediate-pressure turbine outlet (18) into a second turbine discharge line (19). Both the first turbine discharge line (17) and the second turbine discharge line (19) lead into a crossover line (20) which is symbolized by means of a horizontal line. The crossover line (20) is fluidically connected to a low-pressure inlet (21) via a low-pressure inflow line (27).

Downstream of a steam-extraction stage, which is not shown in more detail, a steam extraction line (22) is arranged in the first flow (14) and a steam extraction line (23) is arranged in the second flow (15). The steam which flows into the first flow (14) and into the second flow (15) flows on the one hand via the first turbine discharge line (17) and the second turbine discharge line (19) to the low-pressure turbine section (4) and on the other hand flows via the steam-extraction line (23) to an external steam consumer, which is not shown in more detail. The steam which flows into the steam-extraction line (23) could be used for example as process steam for chemical processes or as heating steam for district heating. This steam must usually be provided at a specific pressure.

The steam power plant (1) additionally has a throttle valve (24) in the crossover line (20). With this throttle valve (24), the pressure of the steam in the crossover line (20) can be set. Furthermore, the pressure of the steam in the steam-extraction line (23) is dependent upon the setting of the throttle valve (24). It is disadvantageous in this case that during steam extraction from the steam-extraction line (23) the total steam which flows via the first turbine discharge line (17) and via the second turbine discharge line (19) into the low-pressure turbine section (4) is throttled. These high throttling losses significantly reduce the mechanical power output.

Figure 2:
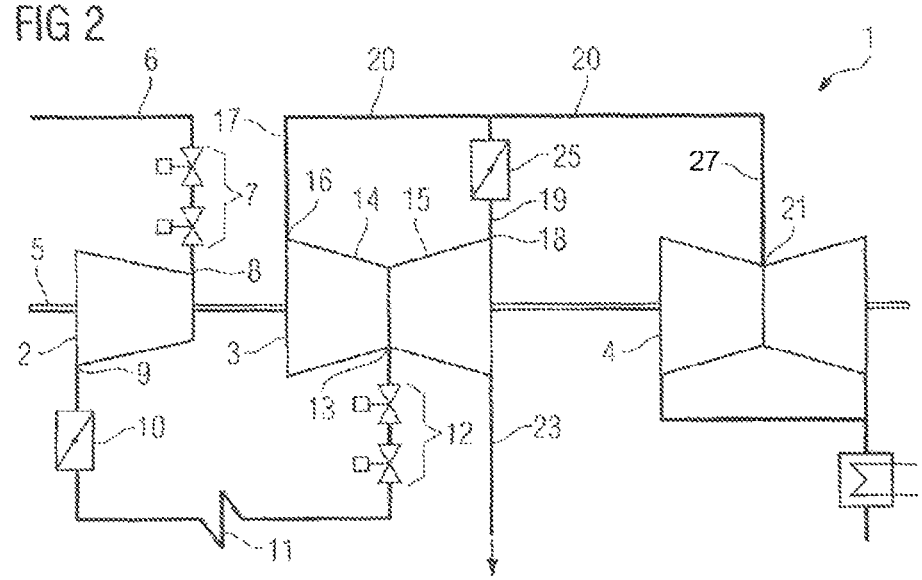
FIG. 2 shows a steam power plant according to the invention.

FIG. 2 shows a steam power plant (1) according to the invention. The difference between the steam power plant (1) shown in FIG. 1 and that shown in FIG. 2 in essence is that the throttle valve (24) in the crossover line (20) is dispensed with. Furthermore, a difference exists in that an extraction throttle valve (25) is arranged in the second turbine discharge line (19). The extraction throttle valve (25), like the throttle valve (24), is designed for altering the steam pressure.

As a result of the throttle valve (25) which is arranged in the second turbine discharge line (19), throttling is now carried out only in the second turbine discharge line (19) and therefore has no direct influence upon the steam parameters of the steam which flows from the first flow (14) into the low-pressure turbine section (4). The steam which issues from the first flow (14) in essence supplies the low-pressure turbine section (4). The steam which issues from the second flow (15) is provided for the steam supply of the external steam consumer. The desired pressure is set via the throttle valve (25) which is arranged in the second turbine discharge line (19). Therefore, only this steam which is throttled via the throttle valve (25) causes a thermodynamic loss. The swallowing capacity of the second flow (15) can be adapted to the external steam consumer. Furthermore, a resultant thrust force as a result of the asymmetry can be compensated by means of suitable shaft inclinations.

The power output loss in the first flow (14) is now considerably less since the steam in the first flow (14) is not subjected to intentional throttling. By the same token, it is possible to design the throttle valve (25), which is arranged in the second turbine discharge line (19), more cost-effectively. It is conceivable to design this throttle valve (25) smaller than the throttle valve (24) according to FIG. 1. As a result, the height of the crossover line (20) can be reduced.

The invention claimed is:

1. A steam power plant, comprising
   an intermediate-pressure turbine section with a first flow, including a first plurality of stages, and a second flow including a second plurality of stages;
   a steam-extraction line in the second flow for extracting steam for an external steam consumer;
   a crossover line;
   a throttle valve; and
   a low-pressure turbine section,
   wherein the first flow includes a first turbine discharge line and the second flow includes a second turbine discharge line,
   wherein the crossover line is fluidically connected to the first turbine discharge line, to the second turbine discharge line, and to the low-pressure turbine section, and
   wherein the throttle valve is arranged in the second turbine discharge line to throttle a steam supply to the external steam consumer and wherein steam supplied to the low-pressure turbine section is substantially provided by the first flow and is not throttled thereby reducing power output loss.

2. The steam power plant as claimed in claim 1, wherein the first turbine discharge line and the second turbine discharge line lead into the crossover line.

3. The steam power plant as claimed in claim 1, wherein the steam-extraction line is arranged downstream of a steam-extraction stage.

4. The steam power plant as claimed in claim 3, wherein the steam-extraction stage is arranged upstream of a last stage.

5. The steam power plant as claimed in claim 1, wherein the external steam consumer is fluidically connected to the steam-extraction line.

6. The steam power plant as claimed in claim 1, wherein the first flow of the intermediate-pressure turbine section is designed for supplying the external steam consumer and the second flow is designed for supplying the low-pressure turbine section.

7. The steam power plant as claimed in claim 1, wherein the crossover line is fluidically connected to a low-pressure inflow line of the low-pressure turbine section.

8. A method for supplying an external steam consumer, comprising:
   providing an intermediate-pressure turbine section with a first flow and a second flow wherein expanded steam from the first flow, via a first turbine discharge line, and expanded steam from the second flow, via a second turbine discharge line, enter a crossover line into a low-pressure turbine section;
   supplying the steam consumer with steam by means of the second flow via a steam-extraction line; and
   using a throttle valve in the second turbine discharge line in order to be able to set a pressure of the steam which issues from the steam-extraction line
   wherein the throttle valve is arranged in the second turbine discharge line and wherein steam supplied to the low-pressure turbine section is substantially provided by the first flow and is not throttled thereby reducing power output loss.

* * * * *